April 23, 1929.  N. F. SAVIANO  1,710,074
BOTTLE FILLING AND CORKING MACHINE
Filed Oct. 19, 1926   9 Sheets-Sheet 1
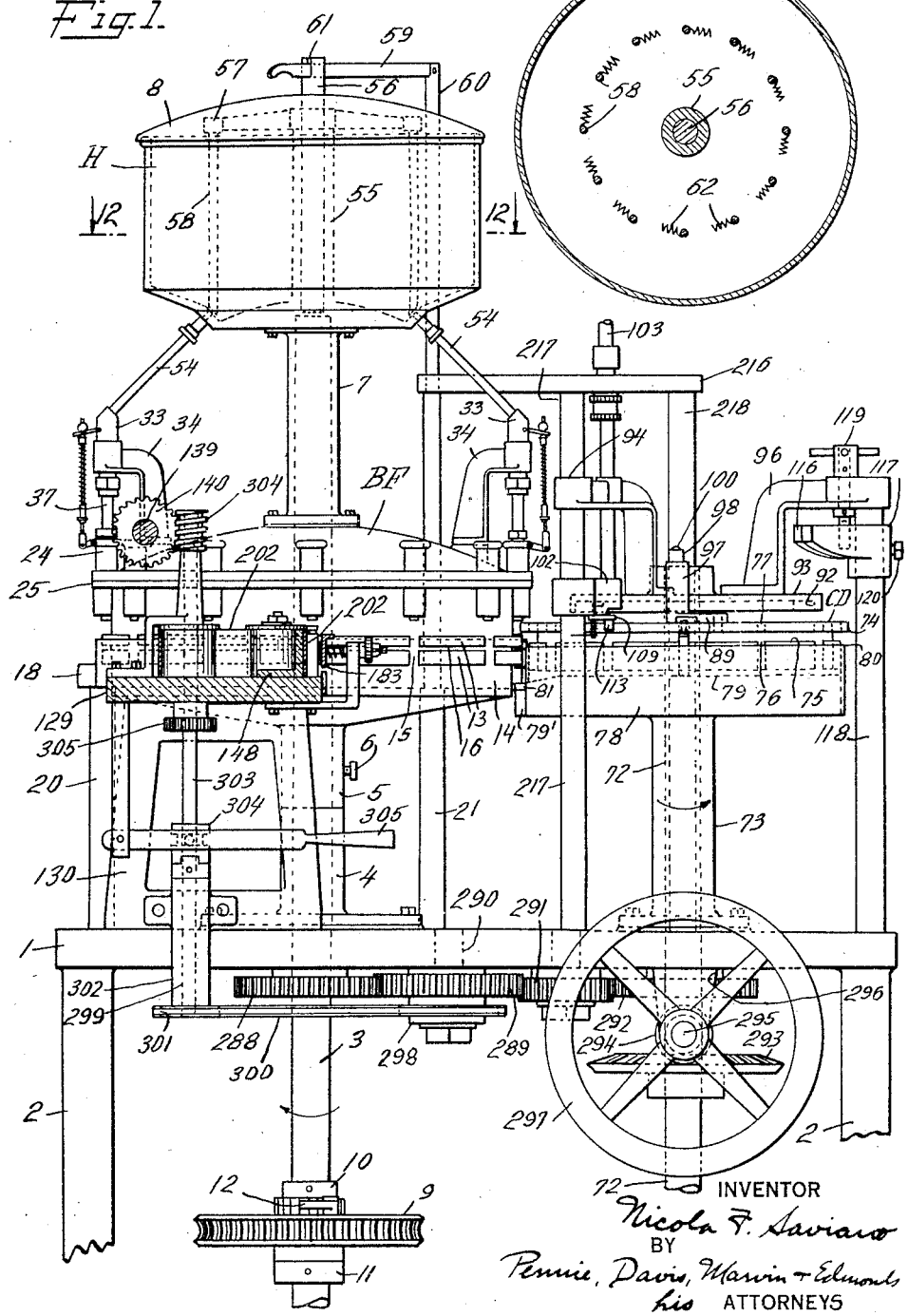

April 23, 1929.  N. F. SAVIANO  1,710,074
BOTTLE FILLING AND CORKING MACHINE
Filed Oct. 19, 1926  9 Sheets-Sheet 2
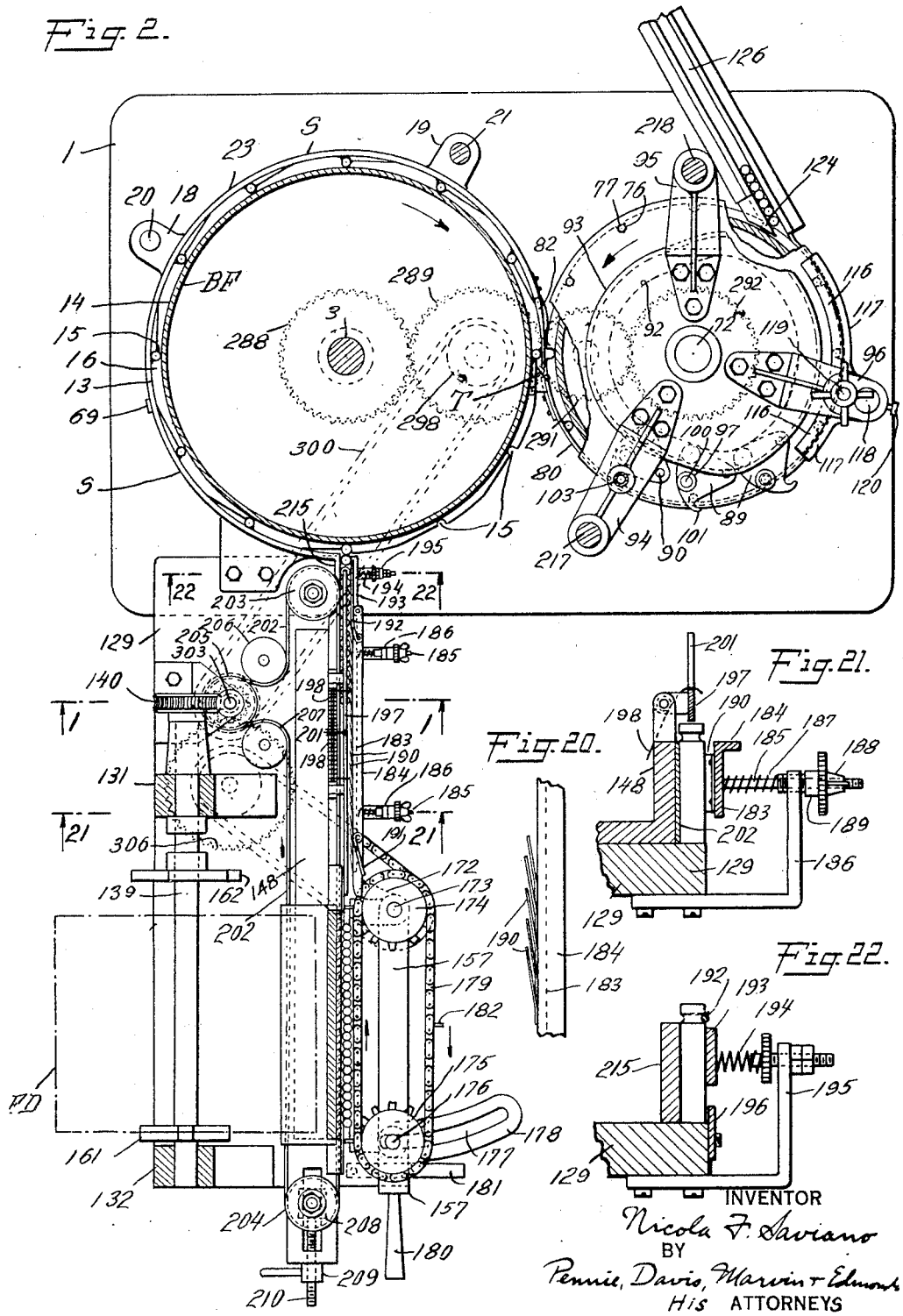

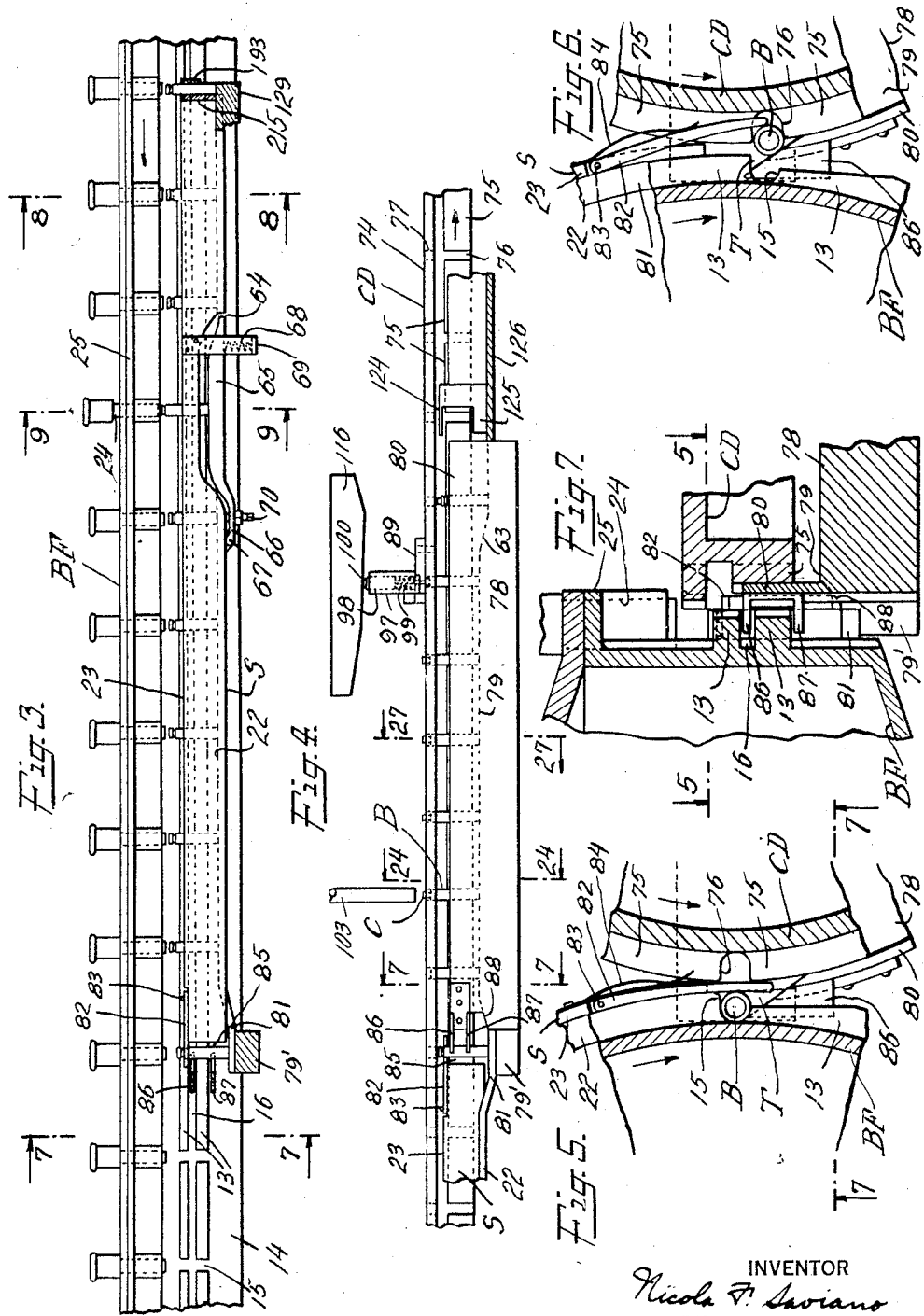

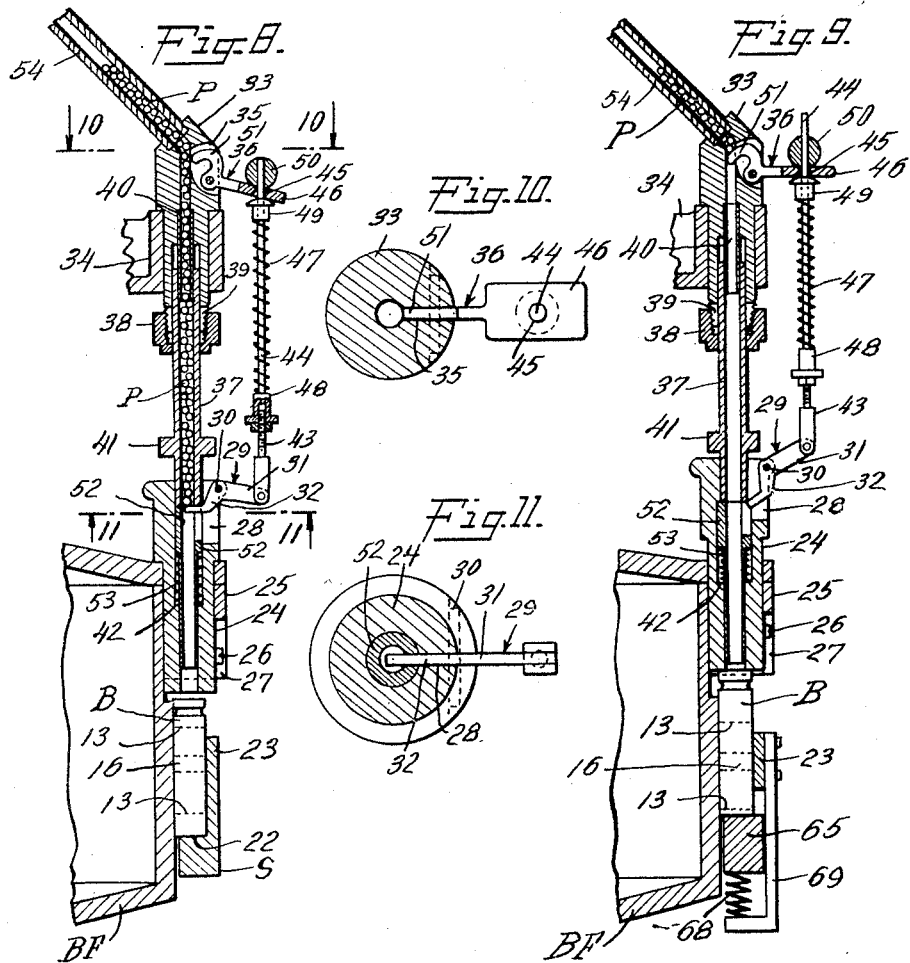

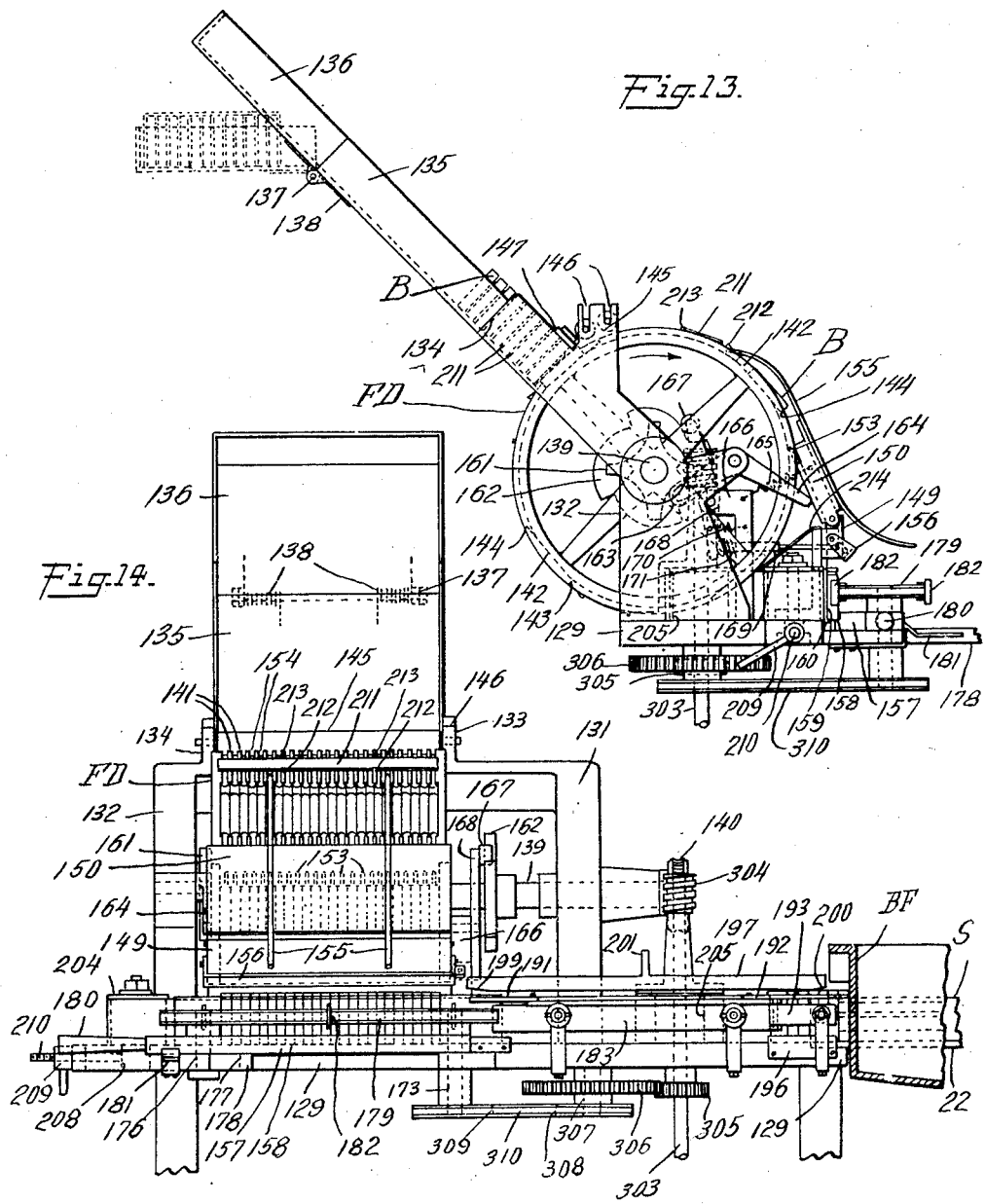

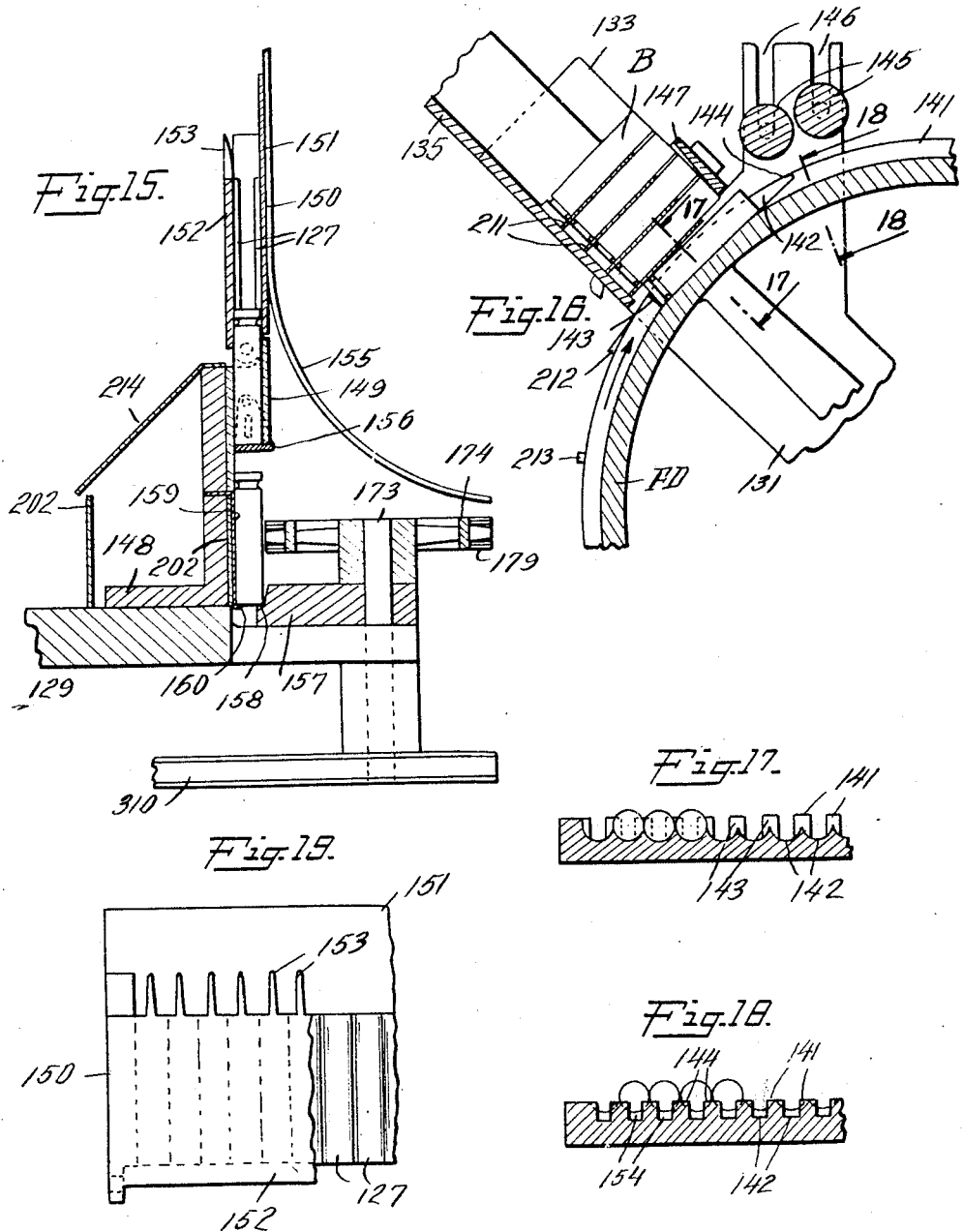

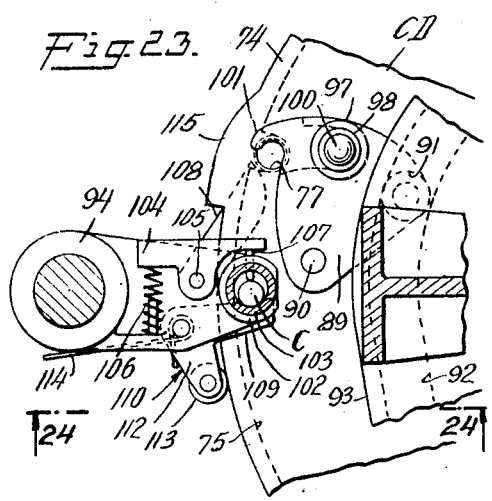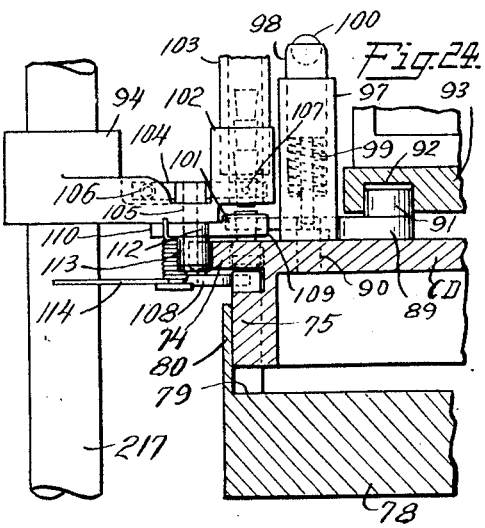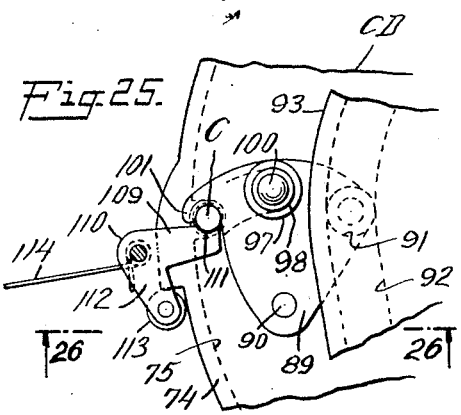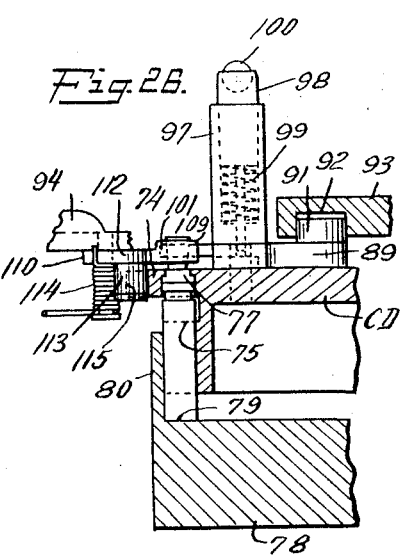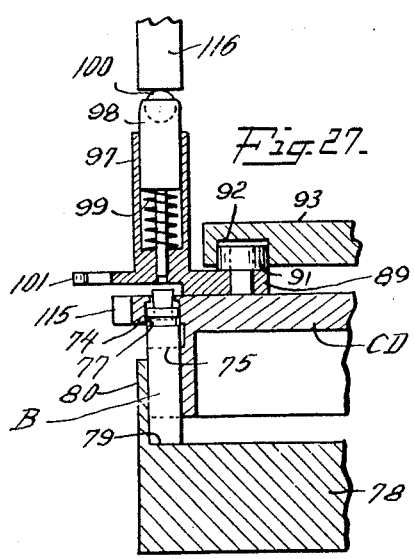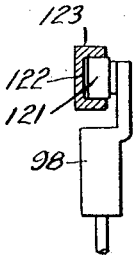

April 23, 1929.  N. F. SAVIANO  1,710,074
BOTTLE FILLING AND CORKING MACHINE
Filed Oct. 19, 1926   9 Sheets-Sheet 8
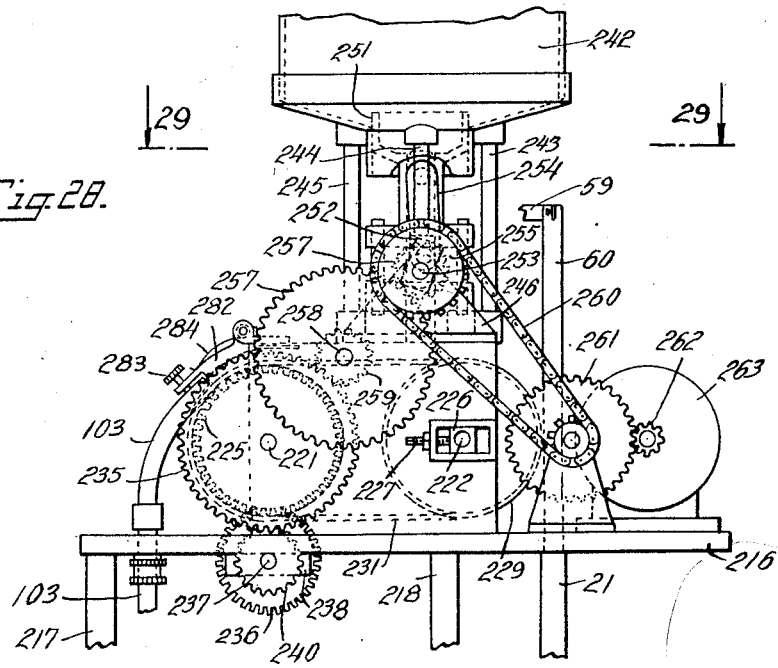
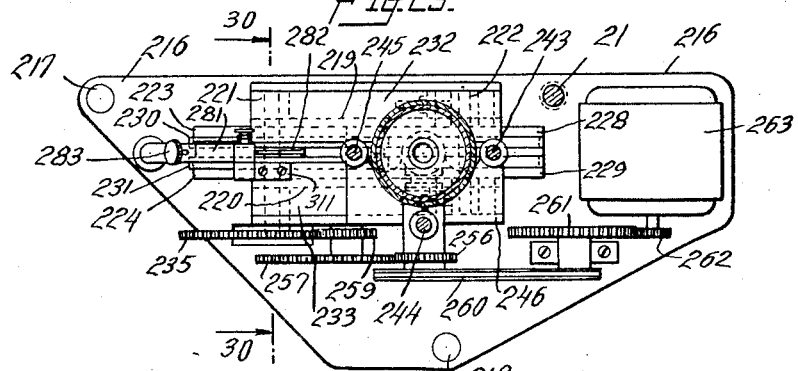
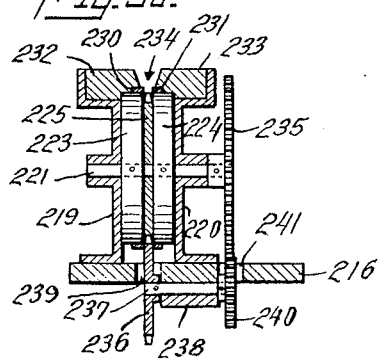
INVENTOR
Nicola F. Saviano
BY
Pennie, Davis, Marvin + Edmonds
His ATTORNEYS

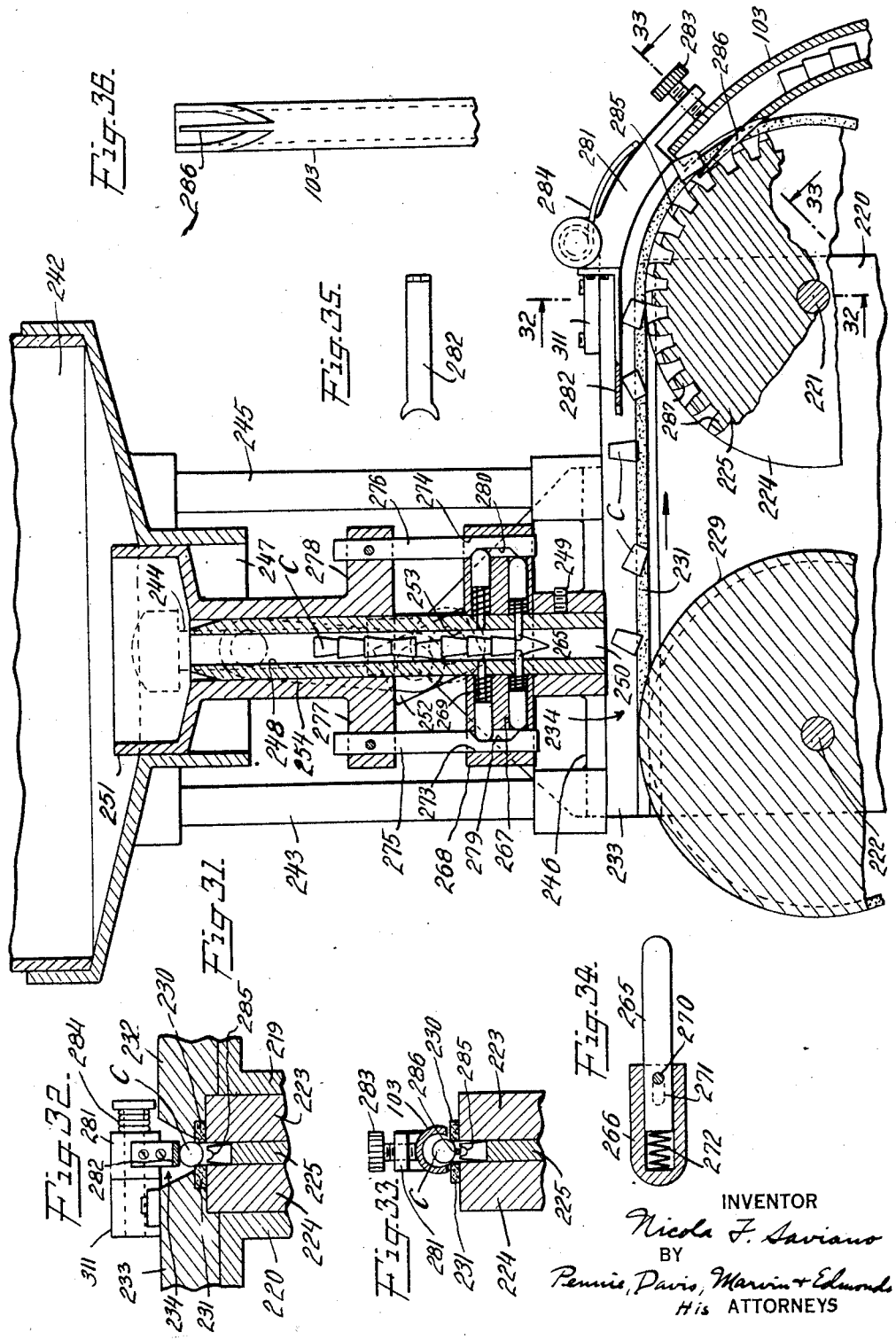

Patented Apr. 23, 1929.

1,710,074

UNITED STATES PATENT OFFICE.

NICOLA F. SAVIANO, OF BROOKLYN, NEW YORK, ASSIGNOR TO CHARLES C. ORCUTT, OF NEW YORK, N. Y.

BOTTLE FILLING AND CORKING MACHINE.

Application filed October 19, 1926. Serial No. 142,537.

This invention relates to a bottle filling and corking machine, and more particularly concerns a machine of this type designed to automatically fill small bottles or vials with a pre-determined number of pills, pellets, or other objects and to cork the filled bottles.

In the packing of large quantities of small articles, such as medical pills or pellets in small containers, such as bottles, it has been found economical and otherwise desirable to employ automatic packing machinery. It is essential that machinery of this type be arranged to perform the packing operations continuously and rapidly, and that the machine be capable of operating with a minimum amount of manual attention.

With the above and other considerations in mind, it is an object of the present invention to provide an automatic bottle filling and corking machine, and, more specifically, to provide a machine of this type in which bottles, vials, or other containers are automatically filled with a pre-determined number of pills, pellets or other small objects, the containers being automatically corked.

The machine of the present invention includes bottle feeding means for arranging the empty bottles in a row and continuously feeding them to a bottle filling mechanism. The filling mechanism is arranged to pick up the bottles one by one and to fill them with a pre-determined number of pills or other objects, after which the bottles are transferred to a corking mechanism in which the corks are tightly inserted, thus completing the packing operation.

The present invention further contemplates the provision of a mechanism for continuously and automatically arranging the bottle corks or stoppers in a pre-determined relation, and feeding them to the bottle corking mechanism with their large ends uppermost, thus avoiding the necessity of a manual operation in arranging the corks.

Other specific objects, advantages and details of the present invention will become apparent as the description thereof progresses.

In describing the invention in detail, reference will be made to the accompanying drawings, in which;

Fig. 1 is a side elevation of the bottle filling and corking mechanism, a portion of the bottle feeding mechanism being shown in a section taken along the line 1—1 of Fig. 2;

Fig. 2 is a plan view, partly in section, of the bottle feeding, filling and corking mechanisms;

Fig. 3 is a side view of a development of the bottle feeding mechanism;

Fig. 4 is a side view of a development of the bottle corking mechanism;

Fig. 5 is a sectional view taken along the line 5—5 of Fig. 7 and viewed in the direction of the arrows;

Fig. 6 is a view similar to Fig. 5 showing portions of the bottle filling and corking drums in slightly different relative positions;

Fig. 7 is a sectional view taken along the line 7—7 of Figs. 3 and 4, and viewed in the direction of the arrows;

Fig. 8 is a sectional side view of the bottle filling mechanism, taken along the line 8—8 of Fig. 3 and viewed in the direction of the arrows;

Fig. 9 is a sectional view, similar to Fig. 8, taken along the line 9—9 of Fig. 3;

Fig. 10 is a sectional view taken along the line 10—10 of Fig. 8 and viewed in the direction of the arrows;

Fig. 11 is sectional view taken along the line 11—11 of Fig. 8, and viewed in the direction of the arrows;

Fig. 12 is a section taken along the line 12—12 of Fig. 1 and viewed in the direction of the arrows;

Fig. 13 is a side elevation of the bottle feeding mechanism;

Fig. 14 is a front elevation of the bottle feeding mechanism;

Fig. 15 is an enlarged sectional view of a portion of the bottle feeding mechanism;

Fig. 16 is an enlarged sectional view of a portion of the bottle feeding drum and certain associative mechanisms;

Fig. 17 is a section of a portion of the bottle feeding drum, taken along the line 17—17 of Fig. 16, and viewed in the direction of the arrows;

Fig. 18 is a section of the bottle feeding drum taken along the line 18—18 of Fig. 16 and viewed in the direction of the arrows;

Fig. 19 is a side view of the bottle catching compartment, certain portions being broken away to show the interior structure thereof;

Fig. 20 is an enlarged plan view of a portion of the bottle feeding guide plate;

Fig. 21 is a sectional view taken along the line 21—21 of Fig. 2 and viewed in the direction of the arrows;

Fig. 22 is a sectional view taken along the line 22—22 of Fig. 2 and viewed in the direction of the arrows;

Fig. 23 is an enlarged plan view of a portion of the bottle corking mechanism;

Fig. 24 is a sectional view taken along the line 24—24 of Figs. 4 and 23, and viewed in the direction of the arrows;

Fig. 25 is a plan view of a portion of the bottle corking mechanism in the position in which a cork is about to be dropped into a bottle;

Fig. 26 is a sectional view taken along the line 26—26 of Fig. 25;

Fig. 27 is a sectional view of the cork depressing apparatus taken along the line 27—27 of Fig. 4;

Fig. 28 is a side elevation of the cork arranging and feeding mechanism;

Fig. 29 is a sectional view taken along the line 29—29 of Fig. 28 and viewed in the direction of the arrows;

Fig. 30 is a sectional view taken along the line 30—30 of Fig. 29 and viewed in the direction of the arrows;

Fig. 31 is an enlarged sectional view of the cork feeding mechanism;

Figs. 32 and 33 are respectively sections taken along the lines 32—32 and 33—33 of Fig. 31;

Fig. 34 is an enlarged view of one of the cork retaining plungers;

Fig. 35 is a plan view of the cork arranging tongue;

Fig. 36 is a view of the underside of the receiving end of the cork feed tube; and Fig. 37 is a view of a modified form of corking plunger, together with a cam for actuating the plunger.

In order to simplify the description of the machine of the present invention, certain portions of the machine and the operation thereof will be separately described.

*Bottle filling mechanism (Figs. 1, 2, 3 and 8 through 12).*

Referring to the drawings, and more particularly to Figs. 1 and 2, the machine of the present invention includes a rectangular platform or table 1, supported from a suitable base or foundation (not shown) by the depending legs 2. A main drive shaft 3 is rotatably journaled in a flanged sleeve 4, suitably secured to the platform 1 as shown. A large hollow drum BF, designates the bottle filling drum, having a depending sleeve 5 rigidly secured to the lower face thereof, is carried by the shaft 3; the sleeve 5 being secured to turn with the shaft 3 by means of the set screw 6. Above the filling drum BF, and mounted thereon to rotate therewith by a flanged sleeve 7 is a cylindrical hopper or pill container H having a removable cover 8.

The two drums BF and H, together with their connecting sleeve 7 and other associated parts are continuously rotated in a clockwise direction, as viewed in Fig. 2, by the main drive shaft 3. The shaft 3 may be driven in any suitable manner from any suitable source of power but is preferably driven through a worm gear 9, mounted between the fixed collars 10 and 11 to turn on the shaft 3, and connect to drive the shaft in one direction only by means of a pawl and ratchet arrangement of the well known type, shown at 12.

A double row of aligned projecting strips 13 are suitably secured around the cylindrical outer face 14 of the filling drum BF, these strips being peripherally spaced to form a plurality of vertically disposed notches 15 of general U-shaped cross section around the periphery of the drum BF, as is shown in Fig. 2. The strips 13 are tapered at their trailing ends, with reference to the direction of rotation of the drum BF as shown, and are arranged in pairs spaced axially of the drum to provide a broken peripheral groove 16 thereon.

A stationary bottle supporting shelf S is secured around approximately three-fourths of the peripheral edge of the drum BF, in close proximity to the strips 13, as shown in Fig. 2, this shelf being suitably supported by the brackets 18 and 19 secured to the vertical supports 20 and 21 respectively. The shelf S is provided with a horizontal portion 22 extending beneath the strips 13, and a vertical portion 23 extending upwardly adjacent the outer faces of these strips as best shown in Figs. 8 and 9. The bottles B which are to be filled are pressed against the cylindrical face of the drum BF by the bottle feeding mechanism which will be hereinafter described, and are picked off one by one in the notches 15 and carried around with the drum BF, these bottles being retained in the notches by the portion 23 of the shelf S, with their lower ends resting on the portion 22 of the shelf.

The mechanism for feeding the pills into the bottles will now be described. Directly above each of the notches 15, is disposed a hollow sleeve 24, slidably carried in an opening formed in an extension 25 near the upper edge of the drum BF as shown in Figs. 8 and 9. The sleeves 24 are held against rotation by the pins 26, secured thereto and extending into vertical slots 27 in the extensions 25 as shown. As each of the sleeves 24 and their associated parts are identical, the mechanism associated with one of these sleeves only will be described, it being understood that this mechanism is duplicated at each of a pre-determined number of equally spaced points around the drum, these points corresponding to the notches 15.

Referring more particularly to Figs. 8 and 9, each sleeve 24 is provided at its upper outer edge with a slot or opening 28, communicating with the interior of the sleeve, in which slot is carried a bell crank lever 29, pivoted on the pin 30 and having one arm 31 extending outwardly from the sleeve 24 as shown. The inner arm 32 of the bell crank lever 29 is arranged to extend into the interior of the sleeve 24 and to close the opening therethrough when in the position shown in Fig. 8. Directly above the sleeve 24, a hollow angle fitting 33 is rigidly supported by the bracket 34 secured to the upper face of the drum BF. The outer face of the angle fitting 33 is provided with a slot or opening extending into the interior thereof, in which is carried a second bell crank lever 36, similar to the lever 29, and arranged to control the opening through the fitting 33. The levers 29 and 36 act as valves to control the flow of pills through the feeding mechanism.

A lower feed tube 37 is adjustably and rigidly secured to the angle fitting 33 by means of the tapered nut 38 engaging the tapered split end 39 of the angle fitting, a short nipple 40 being provided to form a smooth tubular connection between fitting 33 and the feed tube 37. The tube 37 is provided with an integral squared portion 41 which can be conveniently gripped by a wrench or other tool in order to facilitate the adjustment of the vertical position of this tube.

The lower end of the feed tube 37 is slidably inserted into the interior bore of the upper end of the sleeve 24, and bears against the inner arm 32 of the bell crank lever 29 as shown. A rod 43 is pivotably connected with the outer arm 31 of the bell crank lever 29, and is rigidly and adjustably connected to a second rod 44 in any suitable manner. The upper end of the rod 44 passes loosely through an opening 45 in the outer arm 46 of the upper bell crank lever 36; a light spring 47 being coiled about the rod 44 between the shoulder 48 and a slidable stop 49, engaging the arm 46. By properly adjusting the connection between the rods 43 and 44, the bell crank levers 29 and 36 are caused to operate simultaneously, the upper lever 36 opening the passage through the angle fitting 33 when the lower lever 29 closes the passage from the lower feed tube 37 to the sleeve 24 as shown in Fig. 8, and the upper lever 36 closing the passage through the angle fitting 33 when the lower feed tube 37 is opened by the lever 29. A weight 50 is preferably slidably mounted on the upper end of the rod 44 to rest on the outer arm 46 of the bell crank lever 36, this weight acting to force the bell crank lever 36 to its open position when the rod 44 is lowered as shown in Fig. 8.

From a study of the foregoing description taken in connection with Figs. 8 through 11, it will be seen that when the sleeve 24 is forced upwardly as shown in Fig. 9, the lower end of the feed tube 37, being held stationary by the bracket 34, engages the inner arm 32 of the bell crank lever 29, moving this lever to its open position as shown in Fig. 9 and permitting the pills P, formerly retained between the two bell crank levers, to drop into the bottle B, the upper bell crank lever being raised by the rod 44 and spring 47 to shut off the flow of pills in the angle fitting 33, and thereby permitting only a pre-determined quantity of pills to flow into the bottle B. If a pill is directly in the path of the inner arm 51 of the bell crank lever 36, when this operation occurs, the spring 47 is compressed and the pill held beneath the end of this arm, and no crushing or breaking of the pill results. When the sleeve 24 is released, it returns to its lower position, the lever 29 closing the lower opening, and the lever 36 opening the upper opening and thus refilling the angle fitting 33 and the feed tube 37 with a charge of pills.

The sleeve 24 is provided with an inner sleeve 52 slidably mounted therein and pressed against the lower end of the feed tube 37 by means of a coiled spring 53. This inner sleeve 52 provides a smooth interior for the sleeve 24 and avoids the jamming of the pills against the ledge 42 which would be left exposed in the sleeve 24 if this inner sleeve 52 were not provided.

The number of pills admitted to each bottle by the feeding mechanism may be varied by adjusting the position of the lower feed tube 37 in the angle fitting 33. For example, if it is desired to increase the number of pills fed to each bottle, the nut 38 is loosened and the tube 37 is moved downward a short distance with respect to the fitting 33 and again clamped in place. In this manner, the length of the column of pills in the tubes 40 and 37 and the fitting 33 is increased, thereby increasing the number of pills fed to each bottle. The downward movement of the tube 37 causes a slight movement of the lower bell crank lever 29, which movement is not, however, sufficient to permit the pills to drop from the feed tube. The rods 43 and 44 are relatively adjusted so that their combined length is decreased, thus maintaining the upper bell crank lever 36 in the proper position relative to the central opening in the fitting 33. The number of pills fed to each bottle may be decreased by moving the tube 37 upward and thereby shortening the column of pills comprising each charge.

A large quantity of pills is stored within the hopper H, and these pills are carried from the hopper to the angle fittings 33 through the upper feed tubes 54 which are suitably secured to openings in the bottom of the hopper H as shown. The tubes 54 are preferably made of glass, so that the flow of the pills therethrough may be observed. The hopper H is provided with an axially disposed sleeve 55 in the interior thereof, this sleeve being integral with or suitably secured to the base of the hopper to turn therewith. A shaft 56 extends loosely into the interior of the sleeve 55, resting on the upper end of the main drive shaft 3 as shown in Fig. 1. The shaft 56 carries a large wheel 57 rigidly secured thereto, and bearing on the upper end of the sleeve 55. The wheel 57 is provided with a plurality of downwardly extending rods 58, the lower ends of which are arranged in close proximity with the bottom of the hopper H and in line with the openings leading to the feed tubes 54 as clearly shown in Fig. 1. These rods 58 together with the wheel 57 and the shaft 56 are held stationary relative to the hopper H by means of a lever 59, which is pivotally secured to a vertical extension 60 of the support 21, which lever fits into a vertical slot 61 in the shaft 56. The rods 58 are so disposed relative to the hopper H as to prevent the flow of pills through the openings at the base of the hopper during the time when the pills are being admitted to charge the lower feed tube 37. The purpose of this cutting off of the flow of pills is to prevent the loss of a large number of pills when it becomes necessary to remove or replace one of the glass feed tubes 54 or any other pill carrying members of the bottle filling mechanism. In order that the pills may be rapidly forced through the openings in the hopper H while this hopper is rotating, a plurality of coiled springs or wires 62 are secured to the lower ends of the rods 58 in any suitable manner as clearly shown in Fig. 12, these springs lying in close proximity to the openings in the base of the hopper H and rapidly pushing the pills into these openings as the hopper is rotated.

In Fig. 3 the cylindrical edge of the filling drum BF is shown in projected form, in order that a clear understanding of the operation of the bottle filling mechanism may be obtained. The horizontal portion 22 of the bottle supporting shelf S is cut away for a short distance at 64, and an upwardly extending ramp or cam 65 is supported in alignment with the shelf S at this point. The ramp 65 is provided with an offset extension 66 which is hinged to the lower side of the shelf S at the point 67, the opposite end of the ramp being carried by a spring 68, supported by a bracket 69 which is suitably secured to the vertical portion 23 of the shelf S. An adjustable stop 70 is threaded through the offset extension 66 of the ramp 65, and bears against the lower face of the shelf S, thus limiting the upward movement of the ramp under the pressure of the spring 68.

The ramp 65, being held stationary by the shelf S relative to the the rotative movement of the drum BF, is successively engaged by the lower ends of the bottles as they are carried around by the drum, the bottles being thus forced upwardly against their respective associated sleeves 24, lifting these sleeves to their upper positions and thereby causing a charge of pills to be dropped through these sleeves into the bottles as described above. The adjustable stop screw 70 adjusts the initial position of the ramp 65, and the spring 68 is provided to take care of slight variations in the height of the bottles.

*Bottle Transfer and Corking Mechanism (Figs. 1, 7 and 23 through 27).*

After being filled with a predetermined number of pills by the filling mechanism, the bottles are transferred to the corking mechanism and corked.

A vertical shaft 72 is journalled in a flanged sleeve 73, suitably secured to the platform 1, this shaft being keyed or otherwise rigidly secured to a corking drum CD. The drum CD is provided with an outwardly extending flange 74 at its upper end, and is provided with a plurality of aligned spaced extensions 75 integral with or suitably secured to its cylindrical surface beneath this flange. The vertical dimension of the extensions 75 is arranged to be less than the height of the bottles to be corked. The spaces between the extensions 75 are arranged to form equally spaced substantially U-shaped peripheral notches 76 on the drum, these notches being equal in number to the notches 15 on the periphery of the bottle filling drum BF. The shaft 72 is rotated in a counter-clockwise direction, as viewed in Fig. 2, from the main drive shaft 3 through a train of gears as hereinafter described, the two shafts 3 and 72 being arranged to rotate at the same angular velocity. The drums BF and CD carried by the shafts 3 and 72 are arranged in close proximity to one another and are synchronized so that their respective peripheral notches 15 and 76 are in alignment after they pass adjacent to one another. The extending flange 74 of the corking drum CD is provided with a plurality of vertical cylindrical openings 77 as shown in Figs. 1 and 2, one of these openings being directly above and in alignment with each of the notches 76. These openings 77 are enlarged at their lower ends to a diameter greater than the outside diameter of the necks of the bottles B as clearly shown in Figs. 26 and 27.

The sleeve 73 carries a stationary circular bottle supporting platform or shelf 78, arranged to present a horizontal shelf portion 79 extending beneath the notches 76, and a vertical cylindrical wall portion 80 lying in close proximity to the extensions 75 on the drum CD. The wall portion 80 extends around substantially three-fourths of the periphery of the drum CD.

As the filled bottles are carried by the filling drum BF toward the point at which they are transferred to the corking drum CD, (this point being designated at T in Fig. 2) the bottles are lowered to a position in which their upper ends are below the level of the flange 74 on corking drum CD, this being accomplished by a downwardly inclined or lowered portion 81 on the horizontal portion 22 of the bottle supporting shelf S. The lowered portion 81 of the shelf S overlaps a horizontal lowered portion 79' of the supporting table 78 of the corking mechanism at the transfer point T as clearly shown in Fig. 4. At the transfer point T the horizontal supporting wall 23 of the filling mechanism ends, and a movable finger 82, pivoted at 83 and biased by the spring 84, bears against each bottle and movably retains it in its proper position during the transfer operation. An opening 85 is provided in the horizontal bottle supporting wall 80 of the corking mechanism at the transfer point T, and two tapered transfer fingers 86 and 87 are suitably secured to one edge of this wall and extend over the opening 85 as shown in Figs. 4, 5 and 6. The fingers 86 and 87 are provided with pointed ends which extend respectively into the peripheral groove 16, and below the lower of the strips 13 on the filling drum BF, and in close proximity to the cylindrical surface of this drum, as clearly shown in Figs. 3 and 5.

As the two drums rotate, each bottle in turn is carried by the tapered fingers 86 and 87 out of a notch 15 on the filling drum BF and into a notch 76 on the corking drum CD, the bottle being held steadily in an upright position during the transfer operation by the spring pressed finger 82, and moving to a position beneath an opening 77 in the flange 74 of the corking drum. This transfer operation has been shown in Figs. 5 and 6, Fig. 5 showing the relative positions of the drums at which the fingers 76 and 78 first engage the bottle B, and Fig. 6 showing the bottle as it enters the slot 76 on the corking drum CD.

After the transfer operation, the continued rotation of the corking drum CD brings each bottle in turn up an inclined surface 88 on the horizontal portion 79 of the table 78, this surface moving the bottle upward and inserting the neck thereof into the enlarged lower portion of the opening 77 in the flange 74, as shown in Fig. 27. The bottle is now in position for the corking operation.

The upper surface of the corking drum CD is provided with a plurality of sectors 89, one for each of the openings 77 in the flange 74, these sectors being pivotally secured to the drum CD in a suitable manner at the point 90 to move over the surface thereof, as shown in Fig. 2. Each sector 89 is provided with a roller or cam follower 91 secured to the inner corner thereof, and extending upwardly into a cam groove 92 in a stationary cam plate 93. The cam plate 93 is rigidly supported above the drum CD by means of the brackets 94, 95 and 96 as shown in Figs. 1 and 2. Each sector 89 also carries a vertically extending sleeve 97 carrying a corking plunger 98 which is normally held in its retracted or upper position by a spring 99 as clearly shown in Fig. 27. The upper end of the plunger 98 is provided with a suitable anti-friction bearing such as the ball bearing 100. The extreme outer corner of each sector 89 is formed into a hooked shaped extension 101 having an internal radius substantially equal to the radius of the openings 77 in the flange 74 of the corking drum. The under surface of the sector 89 is cut away beneath the extension 101 and the plunger 98 as clearly shown in Figs. 23, 25 and 27.

The bracket 94 is provided with a vertical tubular portion 102 carrying a cork feed tube 103. Bottle corks C of a suitable type are continuously fed through the feed tube 103 with their tapered ends downward by a suitable cork arranging and feeding mechanism as hereinafter described. A pivotally mounted lever 104 is fixed to a shaft 105 journalled in the brackets 94, this lever being biased in a clockwise direction, as viewed in Fig. 23, by a spring 106 as shown. The lever 104 carries a pin 107 which extends through aligned openings in the tubular portion 102 and the feed tube 103, and holds the lowest cork C stationary in the end of the feed tube. A finger or trigger 108 is fixed to the lower end of the shaft 105 and extends over the extensions 75 on the drum CD in a position to be engaged by a bottle as it is carried around by the drum, the normal position of this trigger being best shown in Fig. 23.

As a bottle is carried around by the drum, it engages the trigger 108, moving the lever 104 a distance sufficient to permit the pin 107 to release one cork C from the feed tube 103, the trigger, lever and pin then being returned by the spring 106 to hold the next cork C in the end of the feed tube. The released cork is dropped on the top of the flange 74 near one of the openings 77. As the drum continues to rotate, the cork C is held against movement therewith by an arm 109 of a bell crank lever 110, pivotally supported on the bracket 94 as shown, and having a notch 111 provided in the outer end of the arm 109 for the reception of the cork C. The outer arm 112 of the bell crank lever 110 is provided with a downwardly offset roller 113 adapted to bear against the outer edge of the flange 74, a spring 114 being provided to bias the bell crank lever to the position shown in Figs. 23 and 25. The peripheral edge of the flange 74 is provided with a plurality of outwardly extending trips 115, disposed to engage the roller 113 of the bell crank lever 110 and to quickly snap this lever outwardly as the drum CD is rotated, each trip 115 being disposed adjacent one of the openings 77 in the flange 74, in such a position that the lever 110 is snapped out just as the opening 77 is aligned with the notch 111 in the arm 109.

The cam groove 92 in the stationary cam plate 93 runs parallel to the periphery of the drum CD up to a point just beyond the bracket 94 in the direction of the rotation of the drum, and is spaced a distance from the edge of the flange 74 such that each of the sectors 89 is maintained in a position with its hooked extension 101 aligned with one of the holes 77 in the flange until such sector has passed the bracket 94. As the drum CD rotates, and a bottle approaches the bracket 94, the trigger 108 is engaged and pushed outwardly by the wall of the bottle, releasing a cork C from the tube 103, the remaining corks being retained in the tube by the pin 107 as the trigger 108 is released by the bottle and the lever 104 is returned to its normal position by the spring 106. The cork C drops on the flange 74 and is held against movement therewith by the arm 109 of the bell crank lever 110, the cork resting in the notch 111 at the end of this arm. As the drum continues to rotate, the hooked extension 101 on the sector 89 engages the cork, this extension together with the arm 109 serving to center the cork above the opening 77. At this point in the rotation of the drum, the trip 115 engages the roller 113 of the bell crank lever 110, snapping this lever outwardly and swinging the arm 109 away from the cork C, thus permitting the cork to drop through the opening 77 and into the neck of the bottle B.

The cam groove 92 is so formed as to move each sector 89 outward after the cork C has been dropped through the corresponding opening 77, the sector being thus moved until the corking plunger 98 is directly over the opening 77 as shown in Fig. 27. Shortly after the sector under consideration is moved to this position, the anti-friction ball bearing 100 on the upper end of the plunger 98 is engaged by a cam surface 116 which forces the plunger downward, thus forcing the cork C securely into the neck of the bottle B as shown in Fig. 4. The cam surface 116 is curved to conform with the path of travel of the plunger as shown in Fig. 2, and is suitably secured to a supporting bracket 117 which is slidably carried by the vertical support 118. A vertical adjusting screw 119 is journaled in the stationary bracket 96 and has a screw threaded engagement with the bracket 117, thus permitting the vertical adjustment of the cam surface 116 to vary the depression of the plunger 98. A set screw 120 is preferably provided in the bracket 117, by means of which this bracket may be clamped to the support 118 after adjustment.

A modified form of corking plunger and cam surface is shown in Fig. 37. In this modification, the upper end of the plunger 98 is offset and is provided with a horizontally disposed roller 121 which is engaged by a cam groove or slot 122 in the member 123. The member 123 is secured to the bracket 117 and operates the plunger 98 positively, that is, lifts this plunger out of the opening 77 as well as inserting it therein. The modification of Fig. 37 has a certain advantage over the plunger and cam surface arrangement shown in Figs. 4 and 27, in that this modified form prevents the possibility of the plunger 98 becoming stuck or jammed in its depressed position, which condition might possibly occur due to the collection of dirt or abrasive matter within the sleeve 97.

After the corks C have been inserted and pressed into the bottles, each bottle in turn is lowered to a position in which its neck and cork are withdrawn from the opening 77 in the flange 74, this being accomplished by the lower ends of the bottles passing down an incline 63 in the horizontal portion 79 of the table 78. Each bottle in turn is then picked off of the drum by means of the fingers 124 and 125 which are disposed in close proximity to the surface of the drum CD above and below the extensions 75 respectively. The fingers 124 and 125 guide the bottles into a discharge chute 126 from which they are pushed into a suitable container, not shown.

*Bottle feeding mechanism (Figs. 1, 2 and 13 through 22).*

An outwardly extending feeding platform or table 129 is secured to the main platform 1 by a suitable support 130, the upper surface of the feeding platform being on a level with the horizontal portion 22 of the bottle feeding supporting shelf S on the bottle feeding drum BF. A pair of parallel upwardly extending brackets 131 and 132 are secured in spaced relation to the upper surface of the feeding platform 129 near its outer end as shown in Fig. 14, these brackets having angular offset portions 133 and 134 respectively. A bottle delivery chute 135 is secured between the offset portions 133 and 134 of the brackets 131 and 132, this chute being preferably formed of sheet metal and being disposed at an angle of approximately 45 degrees to the horizontal platform 129. The upper portion 136 of the chute 135 is hinged at 137 to swing downwardly to the position shown in broken lines in Fig. 13, the springs 138 being provided to normally maintain this portion 136 in alignment with the fixed portion 135 of the chute.

A bottle feeding drum FD is carried in a horizontal position on a shaft 139, which shaft is journaled in the brackets 131 and 132 and is driven through a worm wheel 140 as hereinafter described. The drum FD is provided on its outer surface with a plurality of parallel peripherally disposed ridges or extensions 141 as shown in Figs. 16, 17 and 18. The ridges 141 are cut away to form transverse rows of substantially semi-circular depressions 142 at points equally spaced about the periphery of the drum FD. The depressions 142 are somewhat longer than the length of the bottles to be filled, and are formed to present bottle retaining abutments or stops 143 and 144 at the opposite ends thereof as shown in Fig. 16. A pair of rollers 145 are loosely carried in the slots 146 formed in extensions of the brackets 131 and 132, these rollers serving to retain the bottles in the depressions 142 of the drum FD as they are carried away from the delivery chute 135. A tapered metal strip 147 rests on the ends of the bottles at the lower end of the delivery chute, and maintains them in alignment as they are picked off by the drum.

An angle frame 148 is secured to the feeding platform 129 adjacent to the drum FD, which frame carries a fixed bottle delivery compartment 149 having a vertical opening therethrough and extending across the face of the drum as shown in Figs. 13 and 14. A movable bottle catching compartment 150 is pivotally supported at its ends on the delivery compartment 149 and is arranged to swing from a position in which its upper edge bears on the face of the drum FD as shown in Fig. 13, to a position in which its central opening is in vertical alignment with the central opening through the compartment 149, as shown in Fig. 15. The bottle catching compartment 150, shown in detail in Figs. 15 and 19, comprises an outer wall 151 of appreciably greater height than that of the bottles, and an inner wall 152 having a row of upwardly extending fingers 153 on the upper edge thereof. The inner faces of the walls 151 and 152 are provided with oppositely disposed aligned grooves 127 which are shaped to conform with the outer walls of the bottles, these aligned grooves being arranged in alignment with the depressions 142 on the surface of the drum FD. The fingers 153 are spaced to rest in the grooves 154 between the ridges 141 on the drum FD when the compartment 150 is in the position shown in Fig. 13. A pair of elongated curved spring fingers 155 are suitably secured to the outer wall 151 of the bottle catching compartment 150, the upper ends of these fingers being arranged to rest in the grooves 154 on the drum FD when the compartment 150 is inclined against the drum as shown in Fig. 13. The opening at the lower end of the delivery compartment 149 is controlled by a gate 156, pivoted at the opposite ends of this compartment and adapted to be swung outwardly as shown in Fig. 13.

Directly below the opening in the compartment 149 is disposed a plate 157 extending across the face of the drum FD and having an offset extension or groove 158 thereon. Opposite and parallel to this plate 157 is a sheet metal shield 159, secured to the angle bracket 148 in any suitable manner, and having an inturned lower lip or shelf portion 160, disposed directly opposite the groove 158 in the plate 157. The groove 158 and the lip 160 are normally disposed a distance apart equal to the diameter of the bottles to be filled, so that when the bottles are dropped from the compartment 149 by the gate 156 they will drop to a position in which their bases rest between the groove 158 and the lip 160 as clearly shown in Fig. 15. The shield 159 is spaced a short distance away from the face of the angle bracket 148 for a purpose which will hereinafter appear.

The movements of the bottle catching compartment 150 and of the gate 156 are controlled respectively by two cams 161 and 162 fixed to the shaft 139 and rotating with the drum FD. The cam 161 is substantially star shaped, and engages a roller 163 carried by one arm of a bell crank lever 164, the other arm of which engages the inner wall 152 of the movable compartment 150, the bell crank lever 164 being pivotally mounted on an extension of the bracket 132 in any suitable manner. The compartment 150 is biased toward its annular or tilted position by means of a spring 165 connected between this compartment and a bracket 166 as shown in Fig. 13. The cam 162 is provided with a notched cam surface which engages a roller 167 on one end of a lever 168, the other end of which engages the head of a plunger 169, the lever 168 being pivotally mounted on the bracket 166. The plunger 169 is slidably mounted in the bracket 166 and its outer end bears against a lug extending from one end of the gate 156. The lever 168 is biased by the spring 170 to a position in which its roller 167 engages the surface of the cam 162, and the plunger 169 is biased by a spring 171 to a position in which its head is in constant engagement with the lower end of the lever 168, the spring 170 being stronger than the spring 171.

The plate 157 is pivotally connected to an extension 172 of the platform 129 by a shaft 173, and carries two sprocket wheels 174 and 175, the wheel 174 being fixed to the shaft 173 and the wheel 175 being rotatably mounted on a stub shaft 176. The shaft 176 extends through a curved slot 177 in a fixed support 178. An endless feed chain 179 engages the sprocket wheels 174 and 175 and the wheels and chain are driven in the direction indicated by the arrow through the shaft 173 in a manner which will be hereinafter described. A handle 180 is preferably secured to the outer end of the plate 157, and this plate is held in the position shown by a spring catch 181 which may be released to permit the plate 157 to be swung outwardly away from the shelf 159 to release the bottles which may be held between these two members and in order to permit the cleaning, repair or adjustment of certain parts of the mechanism. The chain 179 carries a plurality of extensions 182, spaced along the chain a distance greater than the width of the bottle feeding drum FD.

Parallel with the angle frame 148 and extending from the sprocket wheel 174 to a point adjacent the filling drum BF, is a guide plate 183 having an outwardly extending flange 184 at its upper edge. The plate 183 is supported by rods 185, rigidly secured thereto and slidably engaging the brackets 186 which are suitably secured to the platform 129 as shown in Fig. 21. Coil springs 187 are provided on the rods 185 to force the plate 183 toward the angular bracket 148, the movement of the plate 183 being adjustably limited by means of the nuts 188, screw threaded on the rods 185, and the tension of the springs 187 being adjustable by means of the bushings 189 having a screw threaded engagement with the brackets 186. The interior face of the plate 183 is provided with a plurality of wide spring fingers 190, suitably secured thereto and inclined toward the angle bracket 148 as clearly shown in Fig. 20. Two additional spring fingers, 191 and 192, are secured to the upper flange 184 of the plate 183 at the opposite ends thereof, these fingers extending away from the plate to guide the bottles as they come in to and out of engagement therewith. An extension 193 is pivotally mounted on the plate 183 at the end thereof adjacent the filling drum BF, this extension being pressed toward the angle bracket 148 by means of an adjustable spring 194 carried by a bracket 195 as shown in Fig. 22. A guide member 196 is secured to the outer edge of the platform 129 beneath the extension 193 and beyond the end of the plate 183 as clearly shown in Figs. 14 and 22. An upper guide strip 197 is pivotally secured to the top of the angle bracket 148 and is held in the position shown against suitable stops by means of coiled springs 198. The under surface of the strip 197 is cut away near its ends at 199 and 200 as is clearly shown in Fig. 14, and a handle 201 is provided near the center of this strip in order that the strip may be swung back to give access to the space between the guide plate 183 and the angle bracket 148.

An endless belt 202 passes along the inner surface of the angle bracket 148, passing between the shield 159 and the angle bracket beneath the drum FD as shown in Fig. 15. The belt 202 is carried by a pair of aligned pulleys 203 and 204, rotatably carried on stub shafts at opposite ends of the platform 129, the belt being driven by a pulley 205 and being held in contact therewith by two idler pulleys 206 and 207. The belt 202 is driven in the direction of the arrow by the drive pulley 205 and the proper tension is maintained thereon by the adjustable block 208 carrying the pulley 204, the adjustment being made by the hand nut 209 engaging a threaded rod 210 secured to the block 208 as shown in Fig. 2.

An extension of the vertical portion 23 of the shelf S around the filling drum BF extends away from the drum in a direction tangent to the belt 202 where it engages the pulley 203, this extension forming a guiding wall 215 between the belt 202 and the drum BF.

In the operation of the bottle feeding mechanism, the bottles are first placed in the upper portion 136 of the bottle feeding chute 135, this portion 136 being preferably moved to the position shown in the dotted lines in the Fig. 13, and a carton of empty bottles being inverted therein as shown. The portion 136 of the chute is then allowed to swing back into the position in which it is aligned with the lower portion 135 of the chute, and the box of bottles is allowed to slide down adjacent to the surface of the feeding drum FD, at which point the box or container may be removed. The bottles now lie in parallel rows, there being the same number of bottles in each row as there are bottle receiving depressions 142 across the surface of the drum FD. The tapered strip 147 aligns the rows of bottles, pushing any bottles which may be out of place into contact with the lower face of chute 135. Each row of bottles in turn is picked off by one of the rows of depressions 142 on the surface of the feeding drum FD, the rollers 145 holding the ends of the bottles from tilting out of the depressions due to the weight of the remaining bottles in the chute 135 bearing against the necks of the bottles in the depressions. The bottles are usually packed with cardboard strips 211, placed between the rows thereof, and these strips are caught between two pairs of extensions 212 and 213 fixed to the ridges 141 on the drum, these extensions being disposed between each row of depressions 142 as most clearly shown in Figs. 13 and 14.

As each row of bottles is carried around over the top of the drum FD, the bottles slide down to the leading end of the depressions 142 against the abutments 144 as shown in Fig. 13 and are finally picked off of the drum by the fingers 153 on the inner wall of the bottle catching compartment 150, which fingers pass under the edges of the bottles in the grooves 154 shown in Fig. 18. The cam 161 is designed to permit the bottle catching compartment 150 to swing against the drum as each row of bottles approaches this compartment, and the bottles slide into the interior of this compartment and are held therein by the angular relation between the compartment 150 and the bottle delivery compartment 149. At the same time that the bottles are dropped into the compartment 150, the cardboard strip 211 is picked off of the drum FD by the elongated spring fingers 155 and is allowed to drop down along these spring fingers and away from the machine at their lower ends. If it should occur that one of the cardboard strips 211 passes on under the spring fingers 155, this strip will drop against a shield 214 which is secured to the angle bracket 148 beneath the drum FD and which extends over the belt 202.

The compartment 150 is now moved to its vertical position by the cam 161, the gate 156 being simultaneously closed by the cam 162, and the row of bottles being dropped into the delivery compartment 149 and resting with their lower ends on this gate. As the mechanism continues to operate, the gate 156 is pushed outwardly by the cam 162, acting through its lever 168 and plunger 169, and the row of bottles is dropped to the level of the platform 129, the lower end of each bottle being held between the lip 160 on the shield 159 and the groove 158 on the plate 157. One of the extensions 182 on the feed chain 179 now engages the end bottle of the row as clearly shown in Fig. 13 and pushes the entire row along the shield 159 and into the space between the belt 202 and the guide plate 183, the bottles being pressed against the belt 202 by the spring fingers 190 and being rolled along toward the filling drum BF by the motion of the belt. As the bottles leave the chain 179 and come into contact with the plate 183 they are guided by means of the spring finger 191 which engages each bottle near the upper end thereof. In passing along the guide plate 183, being rolled thereon by the belt 202, there is some tendency for the bottles to creep upwardly, and this is prevented by the upper guide strip 197 which yieldingly engages the upper ends of the bottles and holds them in place. As the bottles pass out of contact with the guide plate 183, their necks and side walls respectively are engaged by the spring finger 192 and the spring pressed extension 193, their lower ends being held in proper position by the member 196.

At the end of the feeding platform 129 adjacent the filling drum BF, the bottles are pressed against the periphery of this filling drum and are picked off one by one and carried around the drum as described above. The various parts of the feeding mechanism are so synchronized with one another that a bottle is always in contact with the surface of the filling drum, a fresh row of bottles being fed at regular intervals by the chain 179 into engagement with the belt 202.

*Cork feeding mechanism (Figs. 1 and 28 through 36).*

In order that the corks may be fed to the corking mechanism with their tapered ends downward, a cork arranging and feeding mechanism is provided which automatically and continuously arranges the corks in this relation and feeds them to the cork feed tube 103.

The cork feeding apparatus is carried by a raised platform or table 216 supported above the filling and corking drums by the supports 21, 217 and 218. Two parallel plates 219 and 220 are suitably secured to the upper surface of the platform 216, these plates carrying two parallel horizontal shafts 221 and 222 journaled therein. The shaft 221 carries two spaced drums 223 and 224 fixed thereto and a gear 225 between these drums, the gear 225 being free to rotate on the shaft. A shaft 222 is journaled in the blocks 226, the horizontal position of this shaft being adjustable by means of the set screws 227 to vary the distance between the shafts 221 and 222. The shaft 222 carries two drums 228 and 229 disposed in alignment with the drums 223 and 224 on the shaft 221. Two parallel endless belts 230 and 231 are carried respectively by the aligned pairs of drums 223, 228, and 224, 229, these belts being spaced apart a distance slightly greater than the smallest diameter and slightly less than the largest diameter of the corks used. The belts 230 and 231 are held in this relation by grooves formed in two oppositely disposed blocks 232 and 233 carried respectively by the plates 219 and 220 and overhanging the upper surfaces of the drums. The blocks 232 and 233 are cut away at an angle on their inner faces to form a downwardly converging channel or groove 234 as clearly shown in Fig. 30.

The shaft 221 together with the drums 223, 224, 228 and 229 are driven by a gear 235 fixed to this shaft, and the gear 225 between the drums 223 and 224 is driven at a slightly higher speed than the drums by the gear 236. The gear 236 is fixed to a shaft 237 journaled in a block 238 carried below the platform 216, the gear 236 passing through an opening 239 in the platform. The shaft 237 is driven from the gear 235 through a pinion 240, fixed to this shaft and passing through an opening 241 in the platform 216.

A cork container or hopper 242 is supported above the plates 219 and 220 by three vertical supports 243, 244 and 245, which supports are fixed to a frame 246 carried on top of the block 233 as shown in Fig. 31. The hopper 242 has a large central opening 247 in the base thereof, into which extends a vertical tube or pipe 248, fixed to the frame 246 by the set screw 249 and having its lower opening 250 directly over the groove 234 between the guide blocks 232 and 233. The space between the tube 248 and the walls of the opening 247 in the hopper 242 is occupied by the enlarged upper end of a movable sleeve member 251 which is slidably mounted on the tube 248 and in the opening 247.

The sleeve 251 is continuously oscillated up and down through a short distance of travel by means of a crank 252 carried by a shaft 253, a connecting rod or link 254 being suitably pivotally connected between the crank 252 and the sleeve 251 as shown in Fig. 31. The shaft 253 carries a sprocket wheel 255 fixed to the outer end thereof, and also carries a small gear 256 engaging a large gear wheel 257. The gear wheel 257 is mounted on a shaft 258 to which is fixed a pinion 259, engaging the gear 235 on the shaft 221. The sprocket wheel 255 is driven through a chain 260 and a gear and pinion 261 and 262 from a suitable source of power such as the small electric motor 263. In this manner all the moving parts of the cork arranging and feeding mechanism are driven in synchronism from the motor 263.

Two pairs of horizontally disposed cork retaining plungers 265 extending through two pairs of aligned oppositely disposed openings near the lower end of the tube 248, these plungers being slidably carried in caps 266 which in turn are slidably mounted in cylindrical openings 267 in a block 268. The vertical distance between the pairs of plungers 265 is arranged to be greater than the height of a single cork C and less than the height of two such corks disposed one above the other. Each of the caps 266 is biased toward its retracted position by a spring 269, and each plunger 265 is secured within its cap by a pin 270 disposed in a slot 271 in the cap, a spring 272 normally retaining the plunger in the extended position as clearly shown in Fig. 34. Two vertical cylindrical openings 273 and 274 are provided in the block 268, these openings communicating with the ends of the openings 267 from which the ends of the sleeves 266 normally protrude. A pair of vertical rods 275 and 276, fixed to the extensions 277 and 278 respectively on the movable sleeve 251, extend respectively into the openings 273 and 274, these rods being provided with the cut away cam surfaces 279 and 280 which engage the ends of the caps 266 as shown. As the sleeve 251 moves up and down, the cam surfaces 279 and 280 alternately move the upper and lower pair of plungers 265 into the tube 254, thus dropping one cork at a time from a tube into the groove 234, and on to the belts 230 and 231.

A curved guide member 281 of substantially U-shaped cross section is pivoted to a fixed block 311 and extends substantially parallel to the periphery of the drums 223 and 224 and the gear 225 as shown in Fig. 31. This guide member 281 carries a cork arranging tongue 282 on one end thereof, the tongue having a curved free end as shown in Fig. 35, and extending into the groove 234 over the belts 230 and 231. The cork feed tube 103 passes through an opening in the plate 216 and is suitably rigidly fixed thereto, the upper end of this feed tube being curved into close proximity with the peripheral edge of the gear 225. An adjusting screw 283, threaded into the guide member 281 engages the upper end of the feed tube 103, the guide 281 together with the tongue 282 being firmly pressed against the feed tube by the spring 284.

The teeth of the gear 225 are cut away at their ends to form a peripheral groove 285 in this gear as shown in Fig. 35. The end of the feed tube 103 is cut away as shown in Fig. 36, and is provided with an integral finger or extension 286 which lies in the peripheral groove 285. It is evident that the position of the guide member 281 relative to the feed tube 103, and the tongue 282 relative to the belts 230 and 231, may be readily adjusted by manipulation of the set screw 283.

In operation, the hopper 242 is filled with corks which are agitated by the upper end of the oscillating sleeve 251 and thus fed into the upper end of the tube 254. The corks are retained by the plungers 265, and are dropped one by one thereby as the plungers are alternately moved in and out of the tube 254. It should be observed that if a pair of plungers 265 should catch a cork between them, the springs 272 will give and the plungers will slide backward into their caps 266, thus avoiding the mutilation of the corks. The corks are then dropped into the groove 234 and are carried along in the direction of the arrow by the belts 230 and 231. The corks fall on to these belts in various positions, and as they are moved under the tongue 282, they are pushed over by this tongue and swung to a position in which their tapered small ends hang downward between the belts, their enlarged ends being caught and held between these belts as best shown in Fig. 32. The corks are then carried under the guide member 281 and over the peripheral edge of the gear 225, and since this gear is rotating at a higher speed than the drums 223 and 224 and the belts carried thereby, the teeth 287 of the gear engage the depending small ends of the corks and swing them into a position in which they lie substantially parallel with the belts with their small ends leading. In this position, the corks are picked out from between the belts 230 and 231 by the finger 286, and are guided thereby into the cork feed tube 103, through which they are fed to the corking mechanism and inserted in the filled bottles as described above.

*The drive (Figs. 1, 2, 13 and 14).*

As described above in connection with the bottle filling mechanism, the filling drum BF together with its hopper H is rotated by the shaft 3 through the worm gear 9, a suitable source of power being connected with this gear. A gear 288 is fixed to the shaft 3 below the platform 1 and engages a gear 289 carried by a stub shaft 290. The gear 289 engages a second gear 291 which in turn engages a gear 292 fixed to the shaft 72, whereby this shaft is rotated by the shaft 3. The gears 288, 289, 291 and 292 are of such a size that the shafts 3 and 72 are rotated at the same angular velocity.

The shaft 72 carries a beveled gear 293 fixed thereto and engaged by a bevel pinion 294, fixed to a shaft 295 carried by a bracket 296. The shaft 295 carries a hand wheel 297 suitably secured thereto so that the entire machine may be slowly moved by hand through the operation of this wheel. This manual operation of the machine is advantageous when it is desired to change the relative positions of certain of the moving parts of the mechanism for the purpose of adjustment, cleaning or repair. When the main source of power is cut off, and the machine operated by hand, the worm gear 9 remains stationary, the pawl and ratchet 12 permitting the shaft 3 and the remaining drive mechanism and moving parts to be moved in their normal direction independently of the source of power.

A sprocket 298 is fixed to the gear 289 and serves to drive a vertical shaft 299 through a chain 300 and a second sprocket 301. The shaft 299 is carried by a vertical sleeve 302 and is arranged to drive a second vertical shaft 303, aligned therewith, through a suitable clutch 304, operated by a hand lever 305. The shaft 303 passes through the platform 129 and drives the shaft 139 through the worm 304 and the worm gear 140 as shown in Fig. 1. The shaft 303 is also fixed to the pulley 205 whereby the belt 202 is driven. A pinion 305 is fixed to the shaft 303 beneath the platform 129 and a gear 306 carried by a stub shaft 307 engages this pinion and drives the shaft 173 through the sprockets 308 and 309 and the chain 310 as shown in Figs. 2, 14 and 15.

The clutch 304 is provided to permit the bottle filling and corking mechanisms to be operated separately from the bottle feeding mechanism or to permit the filling and corking drums to be emptied of bottles for the purpose of cleaning or repairs.

It should be understood that the various elements comprising the driving means are arranged to properly synchronize the bottle feeding and filling mechanisms so that the feeding drum FD, delivery chain 179 and belt 202 cooperate to bring the required number of bottles to the filling drum BF to keep this drum continuously supplied.

By reasons of defects and irregularities in the bottles fed into the machine, it sometimes occurs that bottles are broken in being delivered from the feeding drum FD to the chain 179. When this occurs, the broken glass may be quickly removed by releasing the catch 181 and moving the pivotally supported plate 157 away from the shield 159, thus permitting the broken bottles to drop down free of the machine between these members. Also, if a broken or irregularly formed bottle passes on along the belt 202, it may be reached and removed by swinging the hinged upper guide strip 197 back from the bottles.

The present invention has been described in connection with a single specific machine, and it should be clearly understood that the invention is not limited to the exact mechanical details or expedients shown, and that certain modifications, changes and omissions may be made in the machine without departing from the scope of the invention as defined in the appended claims.

I claim:

1. In a bottle filling machine, a revolving bottle filling drum, a plurality of spaced extensions on the periphery of said drum for carrying bottles, means for continuously feeding empty bottles to the spaces between said extensions, pill feeding means carried by said drum, a stationary shelf adjacent said drum directly engaging and supporting said bottles and means on said shelf for operating said pill feeding means to fill said bottles.

2. In a bottle filling machine, a revolving bottle filling drum, a plurality of spaced extensions on the periphery of said drum for carrying bottles, means for continuously feeding empty bottles to the spaces between said extensions, a pill hopper carried by said drum, a plurality of pill feeding mechanisms communicating with said hopper and disposed over the spaces between said extensions on said drum, a stationary shelf surrounding a portion of the periphery of the said drum and engaging the lower ends of said bottles, and means on said shelf for lifting each of said bottles into engagement with one of said pill feeding mechanisms whereby said mechanism is operated to fill the bottle with a number of pills.

3. In a bottle filling machine, a revolving bottle filling drum, a plurality of spaced extensions on the periphery of said drum for carrying bottles, means for continuously feeding empty bottles to the spaces between said extensions, a pill feeding mechanism carried by said drum over each of said bottles, said mechanism including a movable sleeve, means associated with said sleeve for releasing a predetermined number of pills therefrom when said sleeve is moved upwardly, a stationary shelf surrounding a portion of said drum and engaging the lower ends of said bottles, and means on said shelf for lifting said bottles and said sleeve to fill said bottles with pills.

4. In a bottle filling machine, a revolving bottle filling drum, means on the periphery of said drum for moving bottles around therewith, a stationary shelf extending adjacent said drum for supporting said bottles, feeding mechanism carried by said drum above each of said bottles adapted to feed a predetermined number of pills to each bottle when engaged and lifted thereby, and spring supported means carried by said shelf for lifting each of said bottles into engagement with its corresponding feeding mechanism and operating said feeding mechanism to fill the bottle.

5. In a bottle filling machine, a revolving bottle filling drum, means on said drum for carrying a plurality of bottles spaced around the periphery thereof, a pill feeding device carried by said drum adjacent each of said bottles, said device comprising a pill feed tube having a plurality of spaced valves therein, said tube carrying a predetermined number of pills between said valves, and a sleeve movably connected to said tube and simultaneously operating said valves, and means adjacent said drum for moving each bottle to operate its associated sleeve and valves to permit said predetermined number of pills to flow into said bottle.

6. In a bottle filling machine, a revolving bottle filling drum, means on said drum for carrying a plurality of bottles spaced around the periphery thereof, a pill feeding device carried by said drum adjacent each of said bottles, said device comprising a vertical pill feeding passage, a pair of spaced levers for controlling the flow of pills through said passage, a pill feeding sleeve slidably connected to said passage and connected to simultaneously control said levers, and means adjacent said drum for moving each bottle and its sleeve whereby a predetermined amount of pills is fed from said passage into said bottle.

7. In a bottle filling machine, a revolving bottle filling drum, means on said drum for carrying a plurality of bottles spaced around the periphery thereof, a pill feeding device carried by said drum adjacent each of said bottles, said device comprising a vertical pill feeding passage, a pair of spaced levers for controlling the flow of pills through said passage, a pill feeding sleeve slidably connected to said passage and connected to simultaneously control said levers, means for moving said sleeve to feed a predetermined number of pills therethrough to the bottle, and means for adjusting the length of said passage between said levers whereby the number of pills fed to the bottles may be varied.

8. In a bottle filling machine, a pill container, a tubular pill feeding device connected to said container, means associated with said feeding device for alternately admitting a charge of a predetermined number of pills from said container to said device and feeding said charge of pills from said device to a bottle, and means for adjusting the length of said feeding device to vary the number of pills in said charge.

9. In a bottle filling machine, a pill container, a pill feeding device, a feed tube connecting said device to said container, means associated with said feeding device for alternately admitting a charge of pills from said feed tube and feeding said charge of pills to a bottle, and means in said container for cutting off the flow of pills therefrom to said feed tube while pills are being admitted from said feed tube to said feeding device.

10. In a bottle filling machine, a pill container, a pill feeding device, a feed tube connecting said device to said container, means associated with said feeding device for alternately admitting a charge of pills from said feed tube and feeding said charge of pills to a bottle, means in said container for cutting off the flow of pills to said feed tube while pills are being admitted to said feeding device, and means for accelerating the flow of pills from said container to said feed tube while pills are being fed from said feeding device to the bottle.

11. In a bottle filling machine, a vertical tubular pill feeding device, a pair of spaced pivoted levers alternately movable into the interior of the upper and lower ends of said device to permit a predetermined quantity of pills to flow from said device at a time, and connecting means between said levers for permitting the simultaneous operation thereof, said connecting means being flexible so that the positive operation of one of said levers cannot cause the crushing of pills in the interior of said device by the other of said levers.

12. In a bottle filling machine, a rotary filling drum, means for carrying a bottle on the peripheral edge of said drum, a rotary pill container carried by said drum, a pill feeding device connected with an opening in said container and acting to feed a predetermined number of pills to said bottle, and stationary means within said container for regulating the flow of pills therefrom through said opening.

13. In a bottle filling machine, a rotary bottle filling drum, means for carrying a plurality of bottles on the peripheral edge of said drum, a rotary pill container fixed to said drum, a plurality of pill feeding devices connected to openings in said container and acting to feed pills into said bottles, and a plurality of stationary rods within said container having portions thereof adjacent said openings, whereby the flow of pills from said container to said filling devices is regulated.

14. In a bottle filling machine, a rotary bottle filling drum, means for carrying a plurality of bottles on the peripheral edge of said drum, a rotary pill container fixed to said drum, a plurality of pill feeding devices connected to openings in said container and acting to feed pills into said bottles, a plurality of stationary rods within said container having their free ends disposed in line with said openings to cut off the flow of pills to said feeding devices at certain points in the rotation of said drum, and means connected to the ends of said rods for accelerating the flow of pills through said openings to said feeding device at other points in the rotation of said drum.

15. In a bottle filling machine, a pill container, a feed tube connected to said container, a pair of spaced valves in said feed tube, a sleeve on the lower end of said feed tube operatively connected with one of said valves, yielding means for connecting said valves whereby said valves are operated simultaneously, and means for moving said sleeve to operate said valves.

In testimony whereof I affix my signature.

NICOLA F. SAVIANO.